United States Patent Office 3,825,594
Patented July 23, 1974

3,825,594
BIS(TRIFLUOROMETHYL)BENZAMIDES
William J. Houlihan, Mountain Lakes, N.J., assignor to Sandoz-Wander, Inc., Hanover, N.J.
No Drawing. Continuation-in-part of abandoned application Ser. No. 4,397, Jan. 20, 1970. This application June 24, 1971, Ser. No. 156,459
Int. Cl. C07c 103/22
U.S. Cl. 260—558 R                      23 Claims

ABSTRACT OF THE DISCLOSURE

Bis(trifluoromethyl)benzamides and bis(trifluoromethyl)-N-substituted benzamides, e.g., 2,4-bis(trifluoromethyl)benzamide, are prepared from bis(trifluoromethyl) benzoic acids and are useful as central nervous system depressants and coccidiostats.

---

This application is a continuation in part of copending U.S. application Ser. No. 4,397, filed Jan. 20, 1970, now abandoned.

This application relates to novel derivatives of bis(trifluoromethyl)benzoic acids, their preparation, and their use as anti-depressants and anti-coccidial agents. In particular, it relates to the amino and substituted amino derivatives thereof and intermediate acid chlorides used in their preparation.

The compounds of this invention may be represented by the formula:

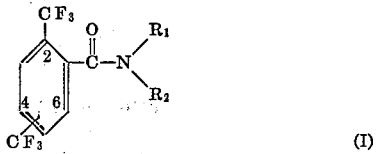

where $R_1$ and $R_2$, independently, represent hydrogen, lower alkyl, i.e., alkyl having 1 to 4 carbon atoms, e.g., methyl, ethyl, isopropyl, etc.; lower alkenyl, i.e., alkenyl having 3 or 4 carbon atoms, e.g., allyl or methallyl, lower alkynyl, i.e., alkynyl having 3 to 5 carbon atoms, e.g., propargyl; cycloalkyl having 3 to 8 ring carbon atoms, e.g., cyclopropyl, cyclohexyl, cycloheptyl and the like; benzyl;

where $R_3$ is hydrogen, halo of atomic weight between about 19 to 36, or methyl;

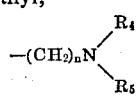

where $n$ is 0, 2, 3, or 4 and $R_4$ and $R_5$ are hydrogen, lower alkyl or phenyl; or $R_1$ and $R_2$ together with N represent 3-azabicyclo[2.2.1]nonane or

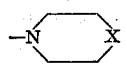

wherein X is O, S, or N—$R_6$, where $R_6$ is hydrogen or lower alkyl, and provided that the trifluoromethyl groups are not on adjacent carbon atoms of the benzene ring.

The CF$_3$ can be in the 4, 5, or 6 position and the following amides are contemplated in this invention:

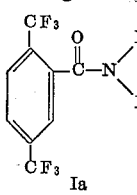
Ia

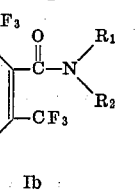
Ib

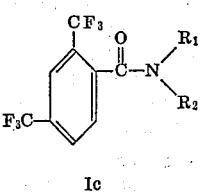
Ic where $R_1$ and $R_2$ are as defined above. The compounds wherein $R_1$ and $R_2$ each independently represents hydrogen, lower alkenyl, lower alkynyl, cycloalkyl having 3 to 8 carbon atoms,

phenyl or benzyl where $R_3$ and $R_4$ independently represent hydrogen or lower alkyl are especially preferred.

The process for preparing the compounds of this invention is shown in the following diagram:

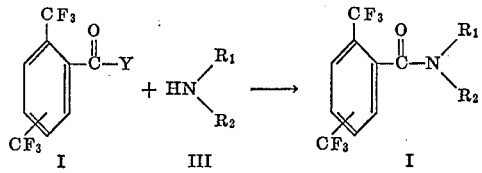

where Y is a halogen having an atomic weight of about 35 to 80, and $R_1$, $R_2$ and the proviso are as set out above.

The product (I) is prepared by aminating an acid halide (II) with an amine (III). The reaction can be carried out in excess acid halide (II) or if desired, an inert solvent can be used. The amine (III) is normally added in the form of an aqueous or inert solvent solution; but if the amine is liquid, it can be added without dilution. The preferred inert solvents are benzene, toluene, pentane, hexane, methylene dichloride, chloroform and the like, especially toluene and methylene dichloride. Excess amine or base, e.g., potassium carbonate, can be added to absorb the acid liberated by the reaction.

Although the temperature is not critical, the reaction is preferably carried out at temperatures between 10° and 50° C., especially 20° to 35° C. For optimum results, it is preferred that the reactions be allowed to run for about 2 to 48 hours. The final product is recovered by conventional techniques, e.g., precipitation and recrystallization.

The present invention also encompasses the acid halide II which is prepared by acylating an acid corresponding to the acyl portion of compound (I) with an inorganic acid halide, e.g., SOCl$_2$, PCl$_3$, PCl$_5$, or SOBr$_2$. The reaction is illustrated in the following scheme using thionyl halide, the preferred acylating agents:

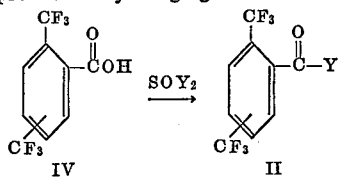

where Y and the proviso are as set out above.

The reaction is carried out in excess halogenating agent or inert solvent. The preferred inert solvents are benzene, toluene, pentane, hexane, heptane, methylene dichloride, chloroform and the like, especially toluene and methylene dichloride. Although the time and temperature of the reaction are not critical, it is preferred that the reaction be run for approximately 1 to 24 hours at a temperature between about 30° C. and 125° C., and especially at the reflux temperature of the system. The acid halide may be recovered by conventional techniques, e.g., evaporation or distillation.

The process for preparing the compounds of formula (IV) is illustrated by the following reaction scheme:

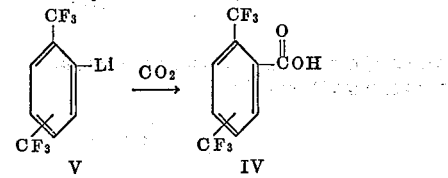

with the proviso set out above for the trifluoromethyl groups.

The acid IV is prepared by treating a lithium intermediate (V) with carbon dioxide in an inert solvent. Although not critical, the reaction is normally carried out at a temperature of from about −10° to about 25° C., and especially at about room temperature. The carbon dioxide used can be a solid or gas. The solvent may be lower hydrocarbon preferably pentane, hexane, heptane and the like, ethers preferably diethyl ether, dibutyl ether and the like, tetrahydrofuran and benzene. Diethyl ether and hexane are especially preferred. The final product is recovered by conventional techniques, e.g., by recrystallization or chromatography. The acids represented by IV have the following structural formulas:

IVa      IVb      IVc where (IVa), (IVb), and (IVc) are, 2,5-bis(trifluoromethyl)benzoic acid, 2,6 - bis(trifluoromethyl)benzoic acid, and 2,4-bis (trifluoromethyl) benzoic acid respectively.

The process for preparing the lithium intermediate (V) is shown by the following reaction scheme:

VI + $R_7Li$ ⟶ V
   VII where $R_7$ is a stright chain alkyl having 1 to 6 carbon atoms, e.g. methyl, ethyl, propyl, butyl, etc., and with the provisio set out above for the trifluoromethyl groups.

The intermediate lithium compound (V) may be prepared by reacting a bis(trifluoromethyl)benzene with a straight chain lower alkyl lithium compound VII having 1 to 6 carbon atoms in an inert solvent in the presence of an inert gas. The preferred alkyl lithium compound is butyl lithium. The preferred solvents are lower hydrocarbons such as pentane, hexane, heptane, and the like, ethers such as diethyl ether, dibutyl ether, and the like, tetrahydrofuran and benzene, especially diethyl ether and hexane. The inert gas may be nitrogen, helium, argon, and the like. The reaction conveniently takes place at temperatures of −15° C. to 45° C. with the preferred temperature range being 15° C. to 25° C.

When the starting material of formula VI is 1,4-bis(trifluoromethyl)benzene $CF_3$—⟨ ⟩—$CF_3$    (VIa)

the lithium intermediate has the structural formula (Va)

When the starting material of formula VI is 1,3-bis(trifluoromethyl)benzene (VIb)

the lithium intermediate can be represented by the structural formula

Using the reaction described above for preparing compound IV, compounds (IVa), (IVb) and (IVc) can be prepared. When 1,4-bis(trifluoromethyl)benzene (VIa) is the starting material, the 2,5-bis(trifluoromethyl)benzoic acid (IVa) is obtained. Starting with the 1,3-bis(trifluoromethyl)benzene (VIb), a mixture of the 2,6-bis(trifluoromethyl)benzoic acid (IVb) and the 2,4 - bis(trifluoromethyl)benzoic acid (IVc) is obtained with the 2,4 - bis-(trifluoromethyl)benzoic acid predominating. Conventional recovery techniques are utilized for obtaining the products (Ia), (Ib) and (Ic).

The compounds of formulas (VI) and (VIII) are known and many of the compounds of formula (III) are known and are prepared by methods disclosed in the literature. Those compounds of formula (III) not specifically disclosed are prepared according to analogous methods from known materials.

Certain of the compounds of formula (I) can also form mineral acid or organic acid salts where tautomerism or the presence of a second amine group permits. For example, where $R_1$ or $R_2$ is a hydrogen, tautomerism in many cases permits salt formation. On the other hand, when $R_1$ or $R_2$ is $$(CH_2)_nN\begin{matrix}R_4\\R_5\end{matrix}$$

or when $R_1$ and $R_2$ together with N is

—N⟨ ⟩N—$R_6$, salts readily form because of the presence of a second amine group.

The compounds of formula (I) and their pharmaceutically acceptable salts in which $R_1$ and $R_2$ are hydrogen are useful because they possess pharmacological properties in animals, such as mammals. In particular, these compounds are useful as central nervous system depressants and can be used as anti-convulsants as indicated by their activity in mice in which convulsive seizures have been chemically induced with strychnine and metrazol using the method of Orloff et al. (Proc. Soc. Exp. Biol., 70:254, 1949).

For this use, the compounds of formula (I) in which $R_1$ and $R_2$ are hydrogen may be combined with a pharmaceutically acceptable carrier or adjuvant. They may be administered orally or parenterally. For this use, the dosage will vary depending upon the mode of administration utilized and the particular compounds employed. However, in general, satisfactory results are obtained when the compounds are administered at a daily dosage of from about 1.4 milligrams to 200 milligrams per kilogram of animal body weight. This daily dosage is preferably given in divided doses, e.g., 2 to 4 times a day, or in sustained release form. For most large mammals, the total daily dosage is from about 75 to 1000 milligrams, and dosage forms suitable for internal administration comprise from about 7.5 milligrams to about 500 milligrams of the compound in admixture with a solid or liquid pharmaceutical carrier or diluent.

A representative formulation suitable for oral administration is a capsule prepared by standard techniques which contains the following:

| Ingredient: | Parts by weight |
|---|---|
| 2,4-bis(trifluoromethyl)benzamide | 50 |
| Inert filler (lactone, kaolin, starch, etc.) | 250 |

The compounds of formula (I) are also useful in the control of poultry coccidiosis. For this purpose, the base form can be administered in the feedstuff of the birds; or the salt form, if structurally possible, can be given in the drinking water. If desired, the compounds can be given by direct administration dissolved or suspended in a suitable solvent. In any event, only minor amounts are needed to obtain the desired anticoccidial effect. For optimum results, it is preferred that the base compounds be administered in the feed of the poultry, which is given ad libitum to the birds. Feed concentrations of from 0.005% to 0.3%, preferably from 0.01% to 0.1% especially from 0.03% to 0.06%, are recommended.

EXAMPLE 1

Preparation of 2,5-bis(trifluoromethyl)benzoic acid

A two neck round bottom flask equipped with a stirrer, dropping funnel and condenser is blanketed with nitrogen and then charged with 100 ml. of anhydrous diethyl ether and 21.4 g. (0.10 moles) of 1,4-bis(trifluoromethyl)benzene. The solution is stirred and treated dropwise (20 minutes) with 75 ml. of 15% n-butyl lithium in hexane (0.12 moles of n-butyl lithium) at room temperature. After stirring an additional 30 minutes at room temperature the reaction mixture is poured onto 200 g. of powdered carbon dioxide. After standing overnight, the resultant semisolid is treated with 200 ml. of 2N sodium hydroxide solution. The basic solution is washed with 100 ml. diethyl ether, acidified with concentrated hydrochloric acid and then extracted with 300 ml. of chloroform. The chloroform layer is dried with sodium sulfate, filtered and concentrated in vacuo. The residue is crystallized from pentane to give 2,5-bis(trifluoromethyl)benzoic acid having a m.p. of 71° C.–73° C.

EXAMPLE 2

Preparation of 2,4-bis(trifluoromethyl)benzoic acid and 2,6-bis(trifluoromethyl)benzoic acid A two neck round bottom flask equipped with a stirrer, dropping funnel and condenser is blanketed with nitrogen and then charged with 100 ml. of anhydrous diethyl ether and 21.4 g. (0.10 mole) of 1,3-bis(trifluoromethyl)benzene. The solution is stirred and treated dropwise (20 minutes) with 75 ml. of 15% N-butyl lithium in hexane (0.12 mole of N-butyl lithium) at room temperature. After stirring an additional 30 minutes at room temperature, the reaction mixture is poured onto 200 g. of powdered carbon dioxide. After standing overnight the resultant semisolid is treated with 200 ml. of 2N sodium hydroxide solution. The basic solution is washed with 100 ml. of diethyl ether, acidified with concentrated hydrochloric acid and then extracted with 300 ml. chloroform. The chloroform layer is dried with sodium sulfate, filtered and concentrated in vacuo. The residue is crystallized from pentane to give 14.0 g. of a mixture of 2,6-bis(trifluoro)benzoic acid and 2,4-bis(trifluoromethyl)benzoic acid having a melting point of 76° C.–83° C. The 2,4-bis(trifluoromethyl)benzoic acid predominates.

Treatment of the crude acid with excess diazo methane in diethyl ether gives, after removal of the ether, crude methyl esters. The methyl esters are separated by gas liquid chromatography. The first 65% of the element is refluxed for 6 hours with 2N potassium hydroxide and then acidified with crude hydrochloric acid. The mixture is extracted with methylene chloride, dried with sodium sulfate, filtered and the solvent removed in vacuo. The residue is crystallized from ether-pentane (1:1) to give 2,4-bis(trifluoromethyl)benzoic acid.

Similar treatment of later fractions of eluent yields 2,6-bis(trifluoromethyl)benzoic acid.

EXAMPLE 3

2,5-bis(trifluoromethyl)benzoyl chloride

A mixture of 140 g. (0.06 moles) of 2,5-bis(trifluoromethyl)benzoic acid and 50 ml. of thionyl chloride are stirred and refluxed for 1.5 hours. The excess thionyl chloride is removed with a water pump and the residue distilled in vacuo to give 2,5-bis(trifluoromethyl)benzoyl chloride, b.p. to ° C. at mm.

When 2,4-bis(trifluoromethyl)benzoic acid or 2,6-bis(trifluoromethyl)benzoic acid is used in place of 2,5-bis(trifluoromethyl)benzoic acid in the above process, there is obtained 2,4-bis(trifluoromethyl)benzoyl chloride and 2,6-bis(trifluoromethyl)benzoyl chloride respectively.

EXAMPLE 4

2,4-bis(trifluoromethyl)benzamide

A solution containing 5.52 g. (0.04 moles) of potassium carbonate, 15 g. (0.12 moles) of 30% ammonium hydroxide in water, and 150 ml. of distilled water is titrated with 8.3 g. (0.03 mole) of 2,4-bis(trifluoromethyl)benzoyl chloride and stirred at room temperature for 16 hours. The solid product is filtered off and crystallized from a 1:1 mixture of methanol and water to give 2,4-bis(trifluoromethyl)benzamide, m.p. 152–153° C.

When 2,6-bis(trifluoromethyl)benzoyl chloride is used in place of 2,4-bis(trifluoromethyl)benzoyl chloride in the above process, there is obtained 2,6-bis(trifluoromethyl)benzamide. When methylamino, dimethylamino anilino or p-chloroanilino is used in place of ammonia in the process of this example, there is obtained the N-methyl, N,N-dimethyl, N-phenyl, or N-p-chloro-phenyl derivatives of 2,4-bis(trifluoromethyl)benzamide, respectively.

EXAMPLE 5

2,5-bis(trifluoromethyl)benzamide

A solution containing 2.5 ml. of 30% ammonium hydroxide and 150 ml. of distilled water is titrated with 8.3 g. (0.03) of 2,5-bis(trifluoromethyl)benzoyl chloride and stirred at room temperature for 16 hours. The resultant product is filtered off and crystallized from a 1:1 mixture of methanol and water. The product obtained is 2,5-bis(trifluoromethyl)benzamide; m.p. 166°–168° C.

When the process of this example is carried out and methylamine, ethylamine, isopropylamine, butylamine, dimethylamine, diallyamine, N-propargylbenzylamine, aniline, diphenylamine, p-chloroaniline, p-fluoroanilne or o-toluidine is substituted for ammonia hydroxide, there is obtained N-methyl-2,5-bis(trifluoromethyl)benzamide,
N-ethyl-2,5-bis(trifluoromethyl)benzamide,
N-isopropyl-2,5-bis(trifluoromethyl)benzamide,
N-butyl-2,5-bis(trifluoromethyl)benzamide,
N,N-dimethyl-2,5-bis(trifluoromethyl)benzamide,
N,N-diallyl-2,5-bis(trifluoromethyl)benzamide,
N-benzyl-N-propargyl-2,5-bis(trifluoromethyl)benzamide,
N-phenyl-2,5-bis(trifluoromethyl)benzamide,
N,N-diphenyl-2,5-bis(trifluoromethyl)benzamide,
N-(p-chlorophenyl)-2,5-bis(trifluoromethyl)benzamide,
N-(p-fluorophenyl)-2,5-bis(trifluoromethyl)benzamide,
or N-(o-tolyl)-2,5-bis(trifluoromethyl)benzamide respectively.

EXAMPLE 6

$N^2,N^2$-dimethyl-2,5-bis(trifluoromethyl)benzoic acid hydrazide

A solution of 8.3 g. (0.03 g. mole) of 2,5-bis(trifluoromethyl)benzoyl chloride in 100 ml. of toluene is added to 5.4 g. (0.09 mole) of N,N-dimethyl hydrazine in 150 ml. of toluene. The mixture is stirred at 25° C. for 16 hours. The reactants are concentrated in vacuo and the residue crystallized from 1:1 methanol-water. The product obtained is $N^2,N^2$-dimethyl-2,5-bis(trifluoromethyl)benzoic acid hydrazide; m.p. 160–161° C. When 2,4-bis(trifluoromethyl)benzoyl chloride is substituted for 2,5-bis(trifluoromethyl)benzoyl chloride in the process above, there is obtained $N^2,N^2$ - dimethyl-2,4-bis(trifluoromethyl)benzoic acid hydrazide.

When hydrazine, N-methylhydrazine, or N-phenylhydrazine is used in place of N,N-dimethylhydrazine in the above process, there is obtained 2,5-bis(trifluoromethyl) benzoic acid hydrazine, $N^2$-methyl-2,5-bis(trifluoromethyl)benzoic acid hydrazide, or $N^2$-phenyl-2,5-bis(trifluoromethyl)benzoic acid hydrazide, respectively.

EXAMPLE 7

N-(3-dimethylaminopropyl)-2,5-bis(trifluoromethyl)-benzamide

Using the procedure of the Example 6, 9.2 g. (0.09 mole) of N,N-dimethyl-1,3-propanediamine in 150 ml. of toluene is titrated with 8.3 g. (0.07 mole) of 2,5-bis(trifluoromethyl)benzoyl chloride in 100 ml. of toluene. The mixture is stirred for 16 hours at 25° C.; and after concentrating by vacuum, the residue is crystallized from 1:1 methanol-water. The product obtained was N-(3-dimethylaminopropyl) - 2,5 - bis(trifluoromethyl)benzamide; m.p. 58.5–60° C.

When 1,3-propanediamine is used in place of N,N-dimethyl-1,3-propanediamine in the process of this example, N-(3-aminopropyl) - 2,5 - bis(trifluoromethyl)benzamide is obtained.

EXAMPLE 8

N-cyclohexyl-2,5-bis(trifluoromethyl)benzamide

Using the procedure of Example 6, (0.03 mol) 2,5-bis(trifluoromethyl)benzoyl chloride are added to 9.0 g. (0.09 mol) of cyclohexylamine in 100 ml. of toluene. The reactants were stirred at room temperature for about 16 hours and then concentrated on rotary vacuum. The crude product is recrystallized from 1:1 methanol-water yielding N-cyclohexyl-2,5-bis(trifluoromethyl)benzamide, m.p. 157°–158° C.

When cyclopropylamine or cycloheptylamine is used in place of cyclohexylamine in the process of this example, there is obtained N-cyclopropyl-2,5-bis(trifluoromethyl) benzamide or N-cycloheptyl-2,5-bis(trifluoromethyl)benzamide. When 2,4-bis-trifluoromethyl)benzoyl chloride is substituted for 2,5 - bis(trifluoromethyl)benzoyl chloride in the process of this example, there is obtained N-cyclohexyl-2,4-bis(trifluoromethyl)benzamide.

EXAMPLE 9

N-(2,5-bis[trifluoromethyl]benzoyl)-3-azabicyclo[2.2.1]nonane

Using the procedure of Example 4, 13.8 g. (0.05 mol) of 2,5-bis(trifluoromethyl)benzoyl chloride are added to 6.9 g. (0.05 m.) of anhydrous potassium carbonate and 6.3 g. (0.05 mol) of 3-azabicyclo[2.2.1]nonane in 150 ml. of toluene. The reactants are stirred for 16 hours at 25° C. and then concentrated under vacuum. The residue is recrystallized using 1:1 methanol water and the product obtained is N-(2,5-bis[trifluoromethyl]benzoyl)-3-azabicyclo[2.2.1]nonane; m.p. 97°–100° C.

When 2,4-bis(trifluoromethyl)benzoyl chloride is substituted for 2,5 - bis(trifluoromethyl)benzoyl chloride in the above process, there is obtained N-(2,4-bis[trifluoromethyl]benzoyl)-3-azabicyclo[2.2.1]nonane.

When the process of this example is carried out and piperazine, N-methylpiperazine, morpholine or thiomorpholine is substituted for 3-azabicyclo[2.2.1]nonane,
N-(2,5-bis[trifluoromethyl]benzoyl)piperazine,
4-(2,5-bis[trifluoromethyl]benzoyl)-1-methylpiperazine,
4-(2,5-bis[trifluoromethyl]benzoyl)morpholine, or
4-(2,5-bis[trifluoromethyl]benzoyl)thiomorpholine, respectively is obtained.

EXAMPLE 10

N-(1,1-dimethylpropargyl)-2,5-bis(trifluoromethyl)benzamide

Following the procedure of Example 6, 8.3 g. (0.03 mol) or 2,5-bis(trifluoromethyl)benzoyl chloride are added to 7.6 g. (0.09 mol) of 1,1-dimethylpropargylamine in 100 ml. of toluene. The reactants are stirred at room temperature for about 16 hours and then concentrated on rotary vacuum. The crude product is recrystallized from 1:1 methanol water yielding N-(1,1-dimethylpropargyl)2,5-bis(trifluoromethyl)benzamide.

When 2,4 or 2,6-bis-(trifluoromethyl)benzoyl chloride is used in place of the 2,5-bis(trifluoromethyl)benzoylchloride in the process of this example, there is obtained N - (1,1 - dimethyl propargyl) - 2,4-bis(trifluoromethyl) benzamide or N - (1,1 - dimethylpropargyl)2,6-bis(trifluoromethyl)benzamide.

What is claimed is:

1. A compound of the formula

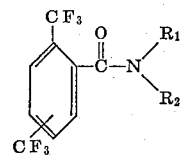

where
$R_1$ is hydrogen, benzyl or

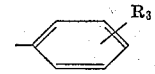

and
$R_2$ is lower alkynyl; cycloalkyl having 3 to 8 ring carbons; benzyl;

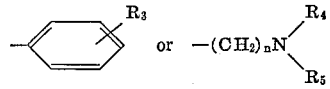

where
$n$ is 0 or 3;
$R_3$ is hydrogen, fluorine, chlorine or methyl; and
$R_4$ and $R_5$ are hydrogen, lower alkyl or phenyl;

provided that the trifluoromethyl groups are not on adjacent carbon atoms of the benzene ring.

2. A compound of the formula

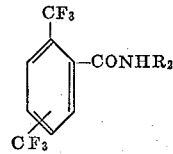

where
$R_2$ is propargyl, 1,1-dimethylpropargyl, cyclopropyl, cyclohexyl, cycloheptyl, amino, methylamino, dimethylamino, anilino, 3-aminopropyl or 3-dimethylaminopropyl, provided that the trifluoromethyl groups are not on adjacent carbon atoms of the benzene ring.

3. The compound of claim 1 which is N-benzyl-N-propargyl-2,5-bis(trifluoromethyl)benzamide.

4. The compound of claim 1 which is N-phenyl-2,5-bis(trifluoromethyl)benzamide.

5. The compound of claim 1 which is N-(p-chlorophenyl)-2,5-bis(trifluoromethyl)benzamide.

6. The compound of claim 1 which is N-(p-fluorophenyl)-2,5-bis(trifluoromethyl)benzamide.

7. The compound of claim 1 which is N-(o-totyl)-2,5-bis(trifluoromethyl)benzamide.

8. The compound of claim 1 which is N,N-diphenyl-2,5-bis(trifluoromethyl)benzamide.

9. The compound of claim 1 which is N-phenyl-2,4-bis(trifluoromethyl)benzamide.

10. The compound of claim 1 which is N-(p-chlorophenyl)-2,4-bis(trifluoromethyl)benzamide.

11. The compound of claim 2 which is 2,5-bis(trifluoromethyl)benzoic acid hydrazide.

12. The compound of claim 2 which is $N^2$-methyl-2,5-bis(trifluoromethyl)benzoic acid hydrazide.

13. The compound of claim 2 which is $N^2$-phenyl-2,5-bis(trifluoromethyl)benzoic acid hydrazide.

14. The compound of claim 2 which is N-(3-aminopropyl) - 2,5-bis(trifluoromethyl)benzoic acid hydrazide.

15. The compound of claim 2 which is N-(cyclopropyl) - 2,5 - bis(trifluoromethyl)benzamide.

16. The compound of claim 2 which is N-(cycloheptyl) - 2,5 - bis(trifluoromethyl)benzamide.

17. The compound of claim 2 which is N-(cyclohexyl)-2,4-bis(trifluoromethyl)benzamide.

18. The compound of claim 2 which is $N^2,N^2$-dimethyl-2,5-bis(trifluoromethyl)benzoic acid hydrazide.

19. The compound of claim 2 which is N-(3-dimethylaminopropyl)-2,5-bis(trifluoromehtyl)benzamide.

20. The compound of claim 2 which is N-cyclohexyl-2,5-bis(trifluoromethyl)benzamide.

21. The compound of claim 2 which is N-(1,1-dimethylpropargyl)-2,5-bis(trifluoromethyl)benzamide.

22. The compound of claim 2 which is N-(1,1-dimethylpropargyl)-2,6-bis(trifluoromethyl)benzamide.

23. The compound of claim 2 which is N-(1,1-dimethylpropargyl)-2,4-bis(trifluoromethyl)benzamide.

References Cited

UNITED STATES PATENTS 3,509,166  4/1970  Wright et al. _____ 260—558

OTHER REFERENCES

Yagupol'skii et al.: J. General Chem. U.S.S.R., vol. 39, pp 2053–56 (September 1969)

HARRY I. MOATZ, Primary Examiner

U.S. Cl. X.R.

260—239 BA, 243 B, 247.7 H, 268 C, 515 R, 544 M, 558 H, 558 P; 424—324, 246, 248, 250, 244